(12) United States Patent
Resch

(10) Patent No.: US 10,980,358 B2
(45) Date of Patent: Apr. 20, 2021

(54) REFRIGERATION UNIT

(71) Applicant: AHT COOLING SYSTEMS GMBH, Rottenmann (AT)

(72) Inventor: Reinhold Resch, St. Peter (AT)

(73) Assignee: AHT COOLING SYSTEMS GMBH, Rottenmann (AT)

( * ) Notice: Subject to any disclaimer, the term of this patent is extended or adjusted under 35 U.S.C. 154(b) by 102 days.

(21) Appl. No.: 16/323,190

(22) PCT Filed: Jul. 31, 2017

(86) PCT No.: PCT/EP2017/069317
§ 371 (c)(1),
(2) Date: Feb. 4, 2019

(87) PCT Pub. No.: WO2018/024673
PCT Pub. Date: Feb. 8, 2018

(65) Prior Publication Data
US 2019/0159607 A1    May 30, 2019

(30) Foreign Application Priority Data

Aug. 3, 2016  (DE) .................... 10 2016 114 336.7

(51) Int. Cl.
*A47F 3/04*    (2006.01)
*G01V 8/20*    (2006.01)
*A47F 10/02*   (2006.01)

(52) U.S. Cl.
CPC .................. *A47F 3/04* (2013.01); *G01V 8/20* (2013.01); *A47F 2010/025* (2013.01)

(58) Field of Classification Search
CPC ....... A47F 3/04; A47F 2010/025; G01V 8/20; F25D 25/00
See application file for complete search history.

(56) References Cited

U.S. PATENT DOCUMENTS

| | | |
|---|---|---|
| 6,259,965 B1 | 7/2001 | Steele et al. |
| 9,518,775 B2 | 12/2016 | Resch |
| 9,560,921 B2 | 2/2017 | Resch |

(Continued)

FOREIGN PATENT DOCUMENTS

| | | |
|---|---|---|
| AT | 509 937 A2 | 12/2011 |
| DE | 20 2016 000 889 U1 | 4/2016 |
| EP | 3 017 725 A1 | 5/2016 |

OTHER PUBLICATIONS

European Patent Office, English language version of the International Search Report, Form PCT/ISA/210 for International Application PCT/EP2017/069317 (3 pages).

*Primary Examiner* — Emmanuel E Duke
(74) *Attorney, Agent, or Firm* — Pauley Erickson & Swanson

(57) ABSTRACT

A refrigeration unit such as a refrigerated counter or horizontal deep freezer, having a refrigeration chamber serving to accommodate goods and surrounded by a base group, a front group, and a back group, and having a stack marking device. A reliable monitoring of a stack height to be maintained is achieved by embodying the stack marking device as a monitoring apparatus that operates based on electromagnetic beams, in particular IR radiation, and has a transmitter device that emits the beams, a receiver device that receives the beams, and an evaluation unit that processes their output signals.

15 Claims, 2 Drawing Sheets

(56) References Cited

U.S. PATENT DOCUMENTS

| | | |
|---|---|---|
| 9,901,190 B2 | 2/2018 | Resch |
| 9,930,974 B2 | 4/2018 | Resch |
| 2007/0150381 A1 | 6/2007 | Pippia et al. |
| 2014/0252091 A1 | 9/2014 | Morse et al. |
| 2014/0316916 A1 | 10/2014 | Hay |
| 2016/0327639 A1* | 11/2016 | Albert .................. G01S 7/4972 |
| 2017/0340141 A1 | 11/2017 | Schwarz |

* cited by examiner

REFRIGERATION UNIT

BACKGROUND OF THE INVENTION

Field of the Invention

This invention relates to a refrigeration unit such as a refrigerated counter, horizontal deep freezer, or vertical display cabinet, having a refrigeration chamber for accommodating goods and surrounded by a base group, a front group, and a back group, and having a stack marking device

Discussion of Related Art

A refrigeration unit of this kind is disclosed in Austrian Patent Reference AT 509 937 A2 and another is disclosed, for example, in German Patent Reference DE 20 2016 000 889 U1. In order to insure that the displayed goods are sufficiently refrigerated to keep them fresh, indications or markings are generally present or provided in the refrigeration chamber and can be used by the operating personnel to monitor that a stack height to be maintained is not exceeded. But such a monitoring is not always guaranteed, particularly in self-service counters, for example.

SUMMARY OF THE INVENTION

One object of this invention is to provide a refrigeration unit of the type mentioned above but, which provides reliable monitoring of a stack height that is to be maintained.

This object and others are achieved with features described in this specification and the claims. In this case, the stack marking device is embodied as a monitoring apparatus that operates based on electromagnetic beams, in particular IR radiation, and has a transmitter device that emits beams, a receiver device that receives the beams, and an evaluation unit that processes their output signals.

These measures automatically detect when refrigerated goods exceed a stack height that is to be maintained in the refrigeration chamber. The application can be advantageously used in refrigeration units such as refrigerated counters or horizontal deep freezers, but also in vertical display cabinets or refrigerated islands, for example.

To provide a reliable monitoring during operation, the beams are positioned so that they extend in a grid or array in at least one plane, preferably a horizontal plane.

In one embodiment for a precise possible monitoring, the transmitter device has multiple transmitters and/or the receiver device has multiple receivers.

In this context, other advantageous embodiments for the design and function include of the fact that transmitters and receivers that are associated with each other are positioned on different sides of the refrigeration chamber or are positioned on the same side and the beams are deflected between the transmitter and receiver by a reflector device.

In this case, transmitters and receivers that are associated with each other can be positioned on opposite sides, for example in the side regions extending at right angles to the front side and back side in the depth direction or can be positioned along the front side and/or back side extending in the longitudinal direction or alternatively or additionally, can be positioned along all four sides or also along only one side, with the beams being correspondingly deflected to each associated receiver by the reflector device.

In one embodiment, the transmitter device and the receiver device, possibly with their electrical contacts and cabling, are positioned in one or more strips.

In other embodiments, the evaluation unit has a detector device for detecting a chronological influence on the output signals caused by an intervention in the refrigeration chamber and/or for detecting a relatively slight local influence on the output signals caused by a foreign object, such as a price tag in the refrigeration chamber.

Through appropriate signal evaluation in the evaluation unit, it is possible, for example, to distinguish whether an operator has performed a temporary intervention in the refrigeration chamber in order to remove a product, in which case an appropriate chronological evaluation can be carried out, for example over a predetermined period of time. In addition or alternatively, an object that is foreign to the refrigerated goods can be disregarded in the signaling of the stack height, for example by allowing or setting a certain degree of vagueness in the signal strength of the output signals so that adhesive price tags are not included in the determination of the stack height or are ignored by the monitoring. Statistical chronological and/or local evaluation methods can also be used.

The maintenance of the stack height can be easily determined by operating personnel if the monitoring apparatus has an electrically controlled optical and/or acoustic display device.

In other embodiments, the evaluation unit is positioned inside a control unit of the refrigeration unit or outside this control unit. A separate embodiment and placement of the evaluation unit particularly permits or facilitates retrofitting.

BRIEF DESCRIPTION OF THE DRAWINGS

This invention is described in greater detail in view of embodiments with reference to the drawings, wherein.

DETAILED DESCRIPTION OF THE INVENTION

Figure 1:
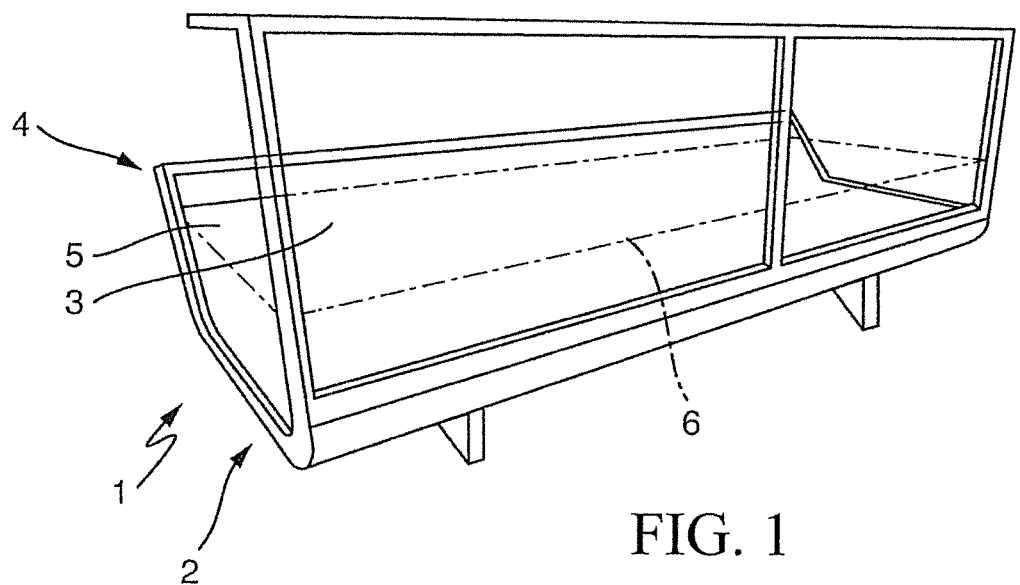
FIG. 1 shows a refrigeration unit in the form of a refrigerated counter such as embodied as a service counter in an oblique perspective view from above with the stack marking device indicated.

As one exemplary embodiment of a refrigeration unit FIG. 1 shows a refrigerated counter 1, in this case, a service counter for counter staff. This invention can also be advantageously used in self-service counters. Another possible embodiment for a refrigeration unit with a stack marking device is a horizontal deep freezer. It is also possible to install it in a vertical display cabinet or refrigerated island.

In the refrigerated counter 1 according to FIG. 1, a stack marking device 6 is provided, which is spaced a certain distance apart from a cooling platform that borders a refrigeration chamber 5 at the bottom and belongs to a base group 2 for accommodating and cooling refrigerated goods. On the front side of the refrigerated counter 1 oriented toward the customers, a front group 3 is positioned on the base group 2 and on the back side oriented toward the operating personnel there is a back group 4.

The stack marking device 6 has a monitoring apparatus 60 for electronically monitoring a maximum stack height or filling height that is to be maintained and not exceeded, which operates based on electromagnetic beams, particularly in the invisible infrared range of the electromagnetic spectrum.

Figure 2:
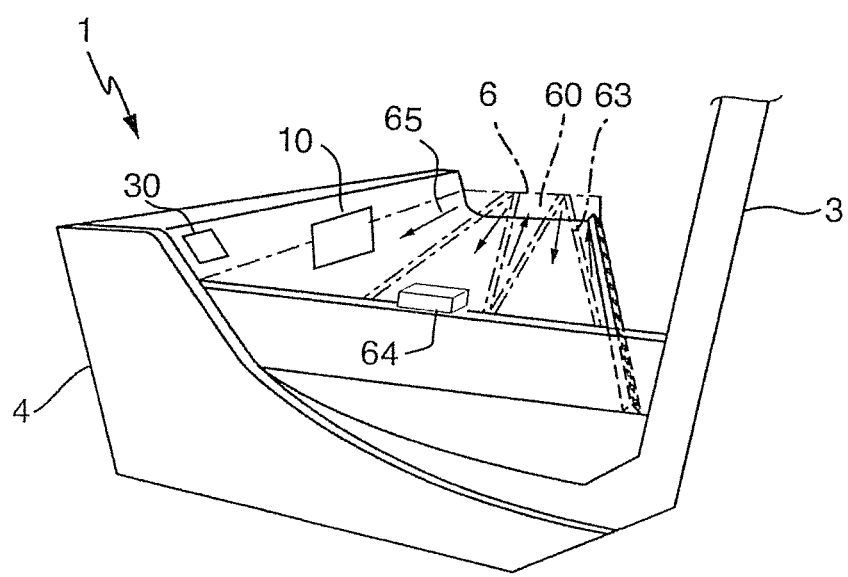
FIG. 2 shows the refrigerated counter according to FIG. 1 in a perspective side view with a depiction of the beam paths.
Figure 3:
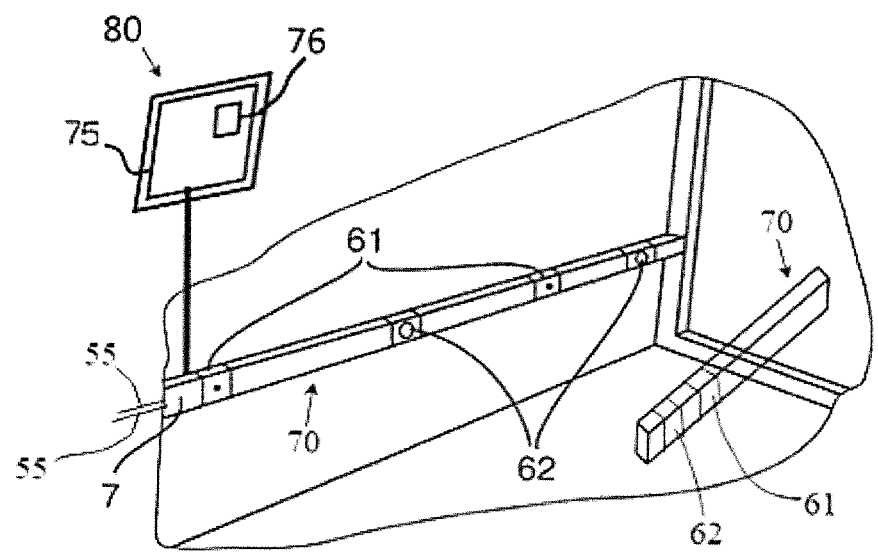
FIG. 3 shows a detail of a refrigeration unit with a stack marking device as well as transmitters and receivers.
Figure 4:
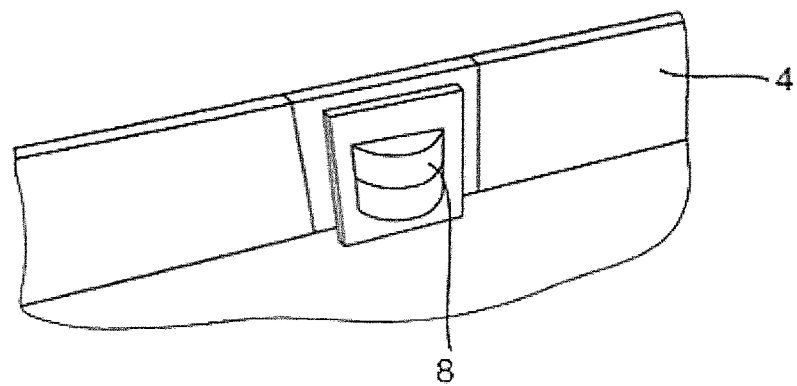
FIG. 4 shows a detail of the refrigeration unit with a display device of the stack marking device.

By way of example, FIG. 2 shows a few beam paths of the beams 63, which are emitted by transmitters of a transmitter device 61 that likewise comprise part of the monitoring apparatus 60 and are received by receivers of a receiver device 62. The transmitters and receivers are integrated into a marking support arrangement 7 that is mounted onto the refrigeration unit or refrigerated counter 1 and that has supporting elements in the form of strips 70, for example stainless steel strips or plastic strips. The transmitters 61 and associated receivers 62 can be positioned on opposing sides of the refrigerated counter 1, for example along the two sides extending in a depth direction or along the front side and/or rear side extending in the longitudinal direction so that the receivers 62 can directly receive beams 63 that are emitted by the transmitters 61 or the beams 63 emitted by the transmitters 61 can be deflected by a reflector device and directed toward associated receivers 62. A one-to-one association of transmitters and receivers is not absolutely required. For example, a receiver can also be associated with multiple transmitters and/or multiple receivers can also be associated with only one transmitter.

In order to reliably detect the stack height, the beams 63 are aimed in a pattern of a light grid or array in a plane corresponding to the stack height, spaced a predetermined distance from the bottom platform that corresponds to the stack height that is to be maintained so that it is also possible to detect and signal the presence of individual refrigerated goods that protrude up beyond the stack height that is to be maintained.

The monitoring apparatus 60 has an evaluation unit 75 for output signals emitted by the receiver device 62, which unit together with a triggering circuit for the stack marking device is positioned inside a control unit 30 of the refrigerated counter 1 or refrigeration unit, for example, or is positioned separate from this and can thus be easily retrofitted. With an electronic circuit or with the inclusion of a computing circuit 76, for example, a detector device 80 is formed, which can detect, for example, an influence on the beams 63 and connected therewith also on the output signals due to interventions performed by operating personnel in the refrigeration chamber 5 and these can be excluded from the signaling of the monitoring of the stack height. This can, for example, take place by presetting a certain time interval that is adapted to a usual duration of such interventions so that only correspondingly long changes in the output signals that indicate an exceeding of the stack height that is to be maintained are detected for the signaling. In addition, it is also possible, for example, for a certain degree of vagueness in the strength of the output signals that are to be detected to be set or remain settable so that a static change that persists for a longer time and that occurs due to the presence of objects 10 that are foreign to the refrigerated goods, such as adhesive price tags, is excluded from the signaling and ignored by the monitoring.

In order to indicate an impermissible exceeding of the stack height that is to be maintained, the monitoring apparatus 60 has an optical and/or acoustic display device 8, which is positioned, for example, on a side of the refrigeration unit that is particularly visible to operating personnel.

The invention claimed is:

1. A refrigeration unit, having a refrigeration chamber (5) serving to accommodate goods and surrounded by a base group (2), a front group (3), and a back group, and having a stack marking device (6), the refrigeration unit comprising:

the stack marking device (6) embodied as a monitoring apparatus (60) operating based on electromagnetic beams (63), in particular IR radiation, and having a transmitter device (61) that emits the beams (63), a receiver device (62) that receives the beams (63), and an evaluation unit that processes output signals emitted by the receiver device (62).

2. The refrigeration unit according to claim 1, wherein during operation, the beams (63) are positioned so that they extend in a grid or an array in at least one plane.

3. The refrigeration unit according to claim 2, wherein the transmitter device (61) has multiple transmitters and/or the receiver device (62) has multiple receivers.

4. The refrigeration unit according to claim 3, wherein transmitters and receivers that are associated with each other are positioned on different sides of the refrigeration chamber (5) or are positioned on a same side and the beams (63) are deflected between the transmitter and receiver by a reflector device.

5. The refrigeration unit according to claim 4, wherein the transmitter device (61) and the receiver device (62) with electrical cabling are positioned in one or more strips (70).

6. The refrigeration unit according to claim 5, wherein the evaluation unit has comprises a detector device configured to evaluate a time duration of an intervention detected in the output signals resulting from an intervention carried out in the refrigeration chamber (5) and/or for detecting a slight influence on the output signals resulting from a foreign object in the refrigeration chamber (5).

7. The refrigeration unit according to claim 6, wherein the monitoring apparatus (60) comprises an optical and/or acoustic display device.

8. The refrigeration unit according to claim 6, wherein foreign object is a price tag.

9. The refrigeration unit according to claim 1, wherein the transmitter device (61) has multiple transmitters and/or the receiver device (62) has multiple receivers.

10. The refrigeration unit according to claim 9, wherein transmitters and receivers that are associated with each other are positioned on different sides of the refrigeration chamber (5) or are positioned on a same side and the beams (63) are deflected between the transmitter and receiver by a reflector device.

11. The refrigeration unit according to claim 1, wherein the transmitter device (61) and the receiver device (62) with electrical cabling are positioned in one or more strips (70).

12. The refrigeration unit according to claim 1, wherein the evaluation unit has comprises a detector device configured to evaluate a time duration of an intervention detected in the output signals resulting from an intervention carried out in the refrigeration chamber (5) and/or for detecting a slight influence on the output signals resulting from a foreign object in the refrigeration chamber (5).

13. The refrigeration unit according to claim 12, wherein foreign object is a price tag.

14. The refrigeration unit according to claim 1, wherein the monitoring apparatus (60) comprises an optical and/or acoustic display device.

15. The refrigeration unit according to claim 1, wherein the refrigeration unit is a refrigerated counter or horizontal deep freezer.

* * * * *